United States Patent [19]

Coker et al.

[11] Patent Number: 5,392,295
[45] Date of Patent: Feb. 21, 1995

[54] ERROR MEASUREMENT CIRCUIT

[75] Inventors: Jonathan D. Coker; Richard L. Galbraith, both of Rochester, Minn.

[73] Assignee: International Business Machines Corporation, Armonk, N.Y.

[21] Appl. No.: 922,591

[22] Filed: Jul. 30, 1992

[51] Int. Cl.[6] ............................................. G11C 29/00
[52] U.S. Cl. .................. 371/21.2; 371/20.4; 324/158.1
[58] Field of Search ............. 371/21.1, 20.4, 20.5, 371/20.6, 21.2, 21.3; 360/31, 25, 45, 51, 55; 375/13, 94, 96, 106; 364/715.11, 724.10, 724.01; 324/76 R, 73.1, 158 R

[56] References Cited

U.S. PATENT DOCUMENTS

| | | | |
|---|---|---|---|
| 3,717,846 | 2/1973 | Kanda et al. | 340/146.1 F |
| 3,755,731 | 8/1973 | Young | 324/34 R |
| 4,251,882 | 2/1981 | Pfefferkorn | 371/28 |
| 4,399,474 | 8/1983 | Coleman, Jr. | 360/46 |
| 4,519,077 | 5/1985 | Amin | 371/21.1 |
| 4,612,586 | 9/1986 | Sordello et al. | 360/31 |
| 4,635,142 | 1/1987 | Haugland | 360/46 |
| 4,821,125 | 4/1989 | Christensen et al. | 360/31 |
| 5,060,088 | 10/1991 | Dolivo et al. | 360/46 |
| 5,200,981 | 4/1993 | Carmon | 375/106 |
| 5,208,832 | 5/1993 | Greiss | 375/13 |
| 5,220,466 | 6/1993 | Coker et al. | 360/46 |
| 5,233,482 | 8/1993 | Galbraith et al. | 360/46 |
| 5,258,940 | 11/1993 | Coker et al. | 364/724.16 |

Primary Examiner—Robert W. Beausoliel, Jr.
Assistant Examiner—Dieu-Minh Le
Attorney, Agent, or Firm—Richard E. Billion; Lisa L. B. Yociss; Andrew J. Dillon

[57] ABSTRACT

The invention provides a circuit and method for performing test procedures on a data storage and recovery system for a magnetic storage unit. Error sample values from a read operator in a data storage and recovery system are applied to a first and a second process path to generate output signals. A source of level samples of a logical data level is also provided. The first process path generates an output signal comprising a square of each error value sample. The second process path compares the error value samples and a compare level and generates an output signal comprising a result of each comparison. The output signal of the first process path, the second process path, or the level samples is selected and is associated with a data type. In response to a coincidence of a data type associated with a selected signal with a desired data type, the selected signal is gated and then accumulated. The window during which the selected signal is accumulated may vary. The accumulated value is used as an input variable to a selected test to determine the accuracy of the data storage and recovery system.

29 Claims, 3 Drawing Sheets

5,392,295

ERROR MEASUREMENT CIRCUIT

TECHNICAL FIELD

1. Technical Field

The present invention relates in general to a data storage and recovery system and in particular to an error measurement circuit for testing a data storage and recovery system. Still more particularly, the present invention relates to an error measurement circuit for testing a data storage and recovery system from error value samples.

2. Description of the Related Art

Computers often include auxiliary data storage units for the archival or long term storage of data and programs. Auxiliary data storage units have media on which data is written and from which data can be read for later use. Magnetic disk units are common auxiliary data storage units. Magnetic disk units use stacked, commonly rotated rigid magnetic disks for storage of data. The magnetically polarizable surfaces of the disks provide the media. Data is recorded in concentric, radially spaced data information tracks arrayed on the surfaces of the disks. Transducer heads driven in a path toward and away from the drive axis write data to the disk surfaces and read data from the disk surfaces.

Data recovery systems generate electrical signals from magnetically polarized regions on the disk surfaces by transducer heads in order to reconstruct the data written to the disk surfaces. Partial-response signaling with maximum-likelihood sequence detection (PRML) techniques are used in digital data communication and recording applications to maximize the likelihood that the data reconstructed by the data recovery system is accurate. The data storage system uses partial-response signaling to produce signals with "controlled" intersymbol interference. Maximum-likelihood sequence detection is the technique used by the data recovery system to produce the most likely estimation of the recorded data.

Various tests are known for evaluating magnetic storage units during their manufacture and operation. Many tests are directed to monitoring the flying height of a slider which carries the transducer head and for determining a precompensation value for correcting nonlinear bit shift.

Some tests performed on data storage and recovery systems have required the use of expensive test equipment. In some sampling systems, equalization values, used to eliminate intersymbol interference, need to be calculated. In order to make the calculation, special test stations are used in the laboratory and manufacturing area which comprise test equipment such as a digital oscilloscope or a logic analyzer and dedicated numeric processors. Each test station may be quite expensive. AS a result, only random units have been tested due to the cost and time involved in performing the tests.

A need exists for reducing failures of data storage and recovery systems by obtaining detailed magnetic information about all units. A need also exists for accumulating results of procedures performed on the data storage and recovery systems in a data base to be accessed at a later time for evaluation of the accuracy of the manufacturing processes. A need exists for performing procedures on every data storage and recovery system and permitting the results of the procedures to be immediately available to the manufacturing data base, so that problems in the manufacturing process could be solved early in the manufacturing process.

SUMMARY OF THE INVENTION

It is therefore one object of the present invention to provide an error measurement circuit for performing procedures on a data storage and recovery system.

It is another object of the present invention to provide an error measurement circuit for performing procedures on a data storage and recovery system utilizing error value samples.

The foregoing objects are achieved as is now described. The invention provides a circuit and method for performing test procedures on a data storage and recovery system for a magnetic storage unit. Error sample values from a read operator in a data storage and recovery system are applied to a first and a second process path to generate output signals. A source of level samples of a logical data level is also provided. The first process path generates an output signal comprising the square of each error value sample. The second process path compares the error value samples and a compare level and generates an output signal comprising a result of each comparison. The output signal of the first process path, the second process path, or the level samples is selected and is associated with a data type. In response to a coincidence of a data type associated with the selected signal with a desired data type, the selected signal is gated and then accumulated. The window during which the selected signal is accumulated may vary. The accumulated value is used as an input variable to a selected test to determine the accuracy of the data storage and recovery system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
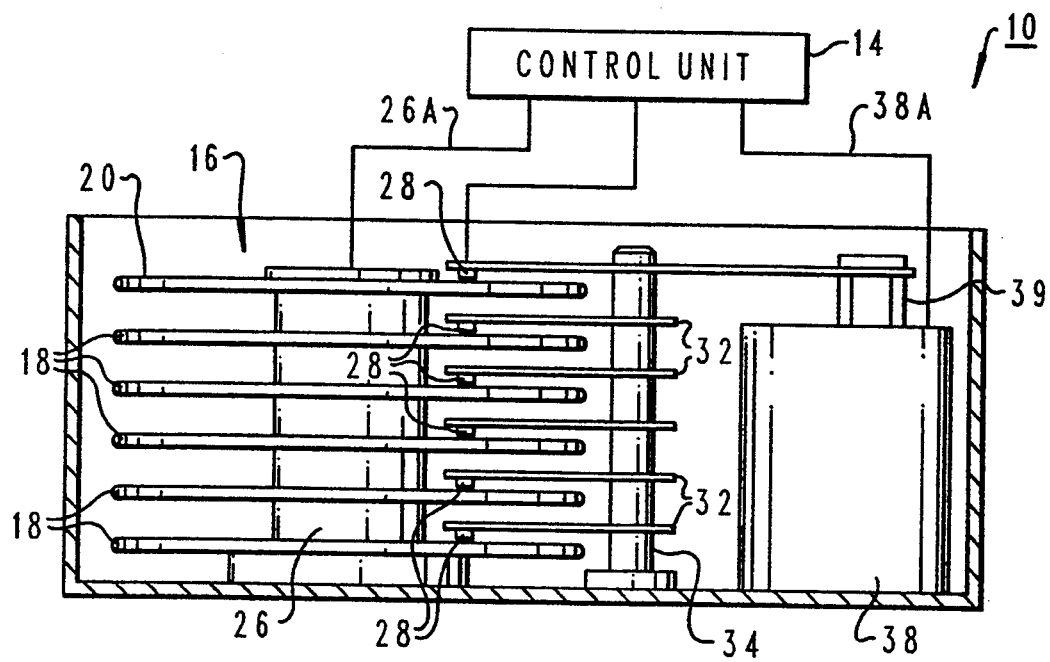
FIG. 1 is a schematic and block diagram of a data storage and recovery system embodying the present invention.

With reference now to the figures and in particular with reference to FIG. 1, there is shown a partly schematic block diagram of parts of a data storage and recovery system 10 and an interface control unit generally designated as 14. Data storage and recovery system 10 is illustrated in simplified form sufficient for an understanding of the present invention because the utility of the present invention is not limited to the details of a particular drive unit construction.

Figure 2:
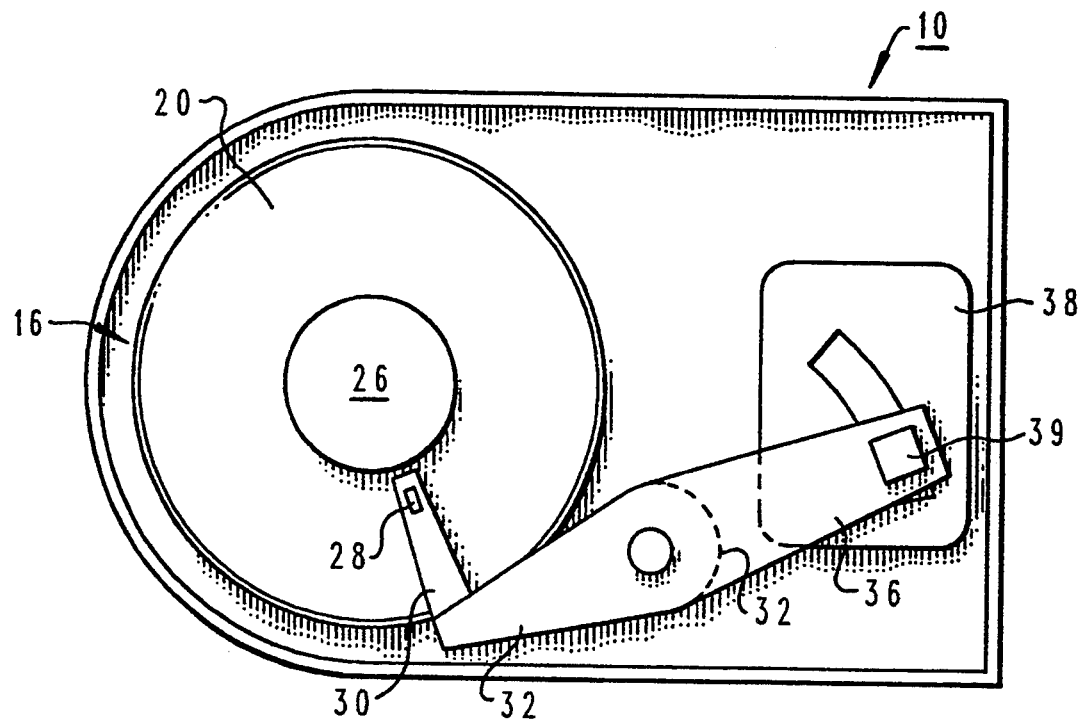
FIG. 2 is a diagram showing the accessing mechanism for a single disk surface of the data storage and recovery system of FIG. 1.

Referring now to FIGS. 1 and 2 of the drawings, data storage and recovery system 10 includes a stack 16 of disks 18 each having at least one magnetic surface 20. The disks 18 are mounted in parallel for simultaneous rotation on and by an integrated spindle and motor assembly 26. Data information on each disk 18 are read and/or written by a corresponding transducer head 28 movable across the disk surface 20.

Transducer heads 28 are mounted on flexure springs 30 carried by arms 32 engaged together for simultaneous pivotal movement about a support spindle 34. One of the arms 32 includes an extension 36 driven in a pivotal motion by a head drive motor 38. Although several drive arrangements are commonly used, the motor 38 can include a voice coil motor (VCM) 39 cooperating with a magnet and core assembly (not seen) operatively controlled for moving the transducer heads 28 in synchronism in a radial direction in order to position the heads in registration with data cylinders to be followed. The VCM 39 is movable within a fixed magnetic field, and the direction and velocity of the coil movement is controlled by the current supplied. The various components of the disk file 10 are controlled in operation by signals generated by control unit 14 such as motor control signals on line 26A and position control signals on line 38A.

Figure 3:
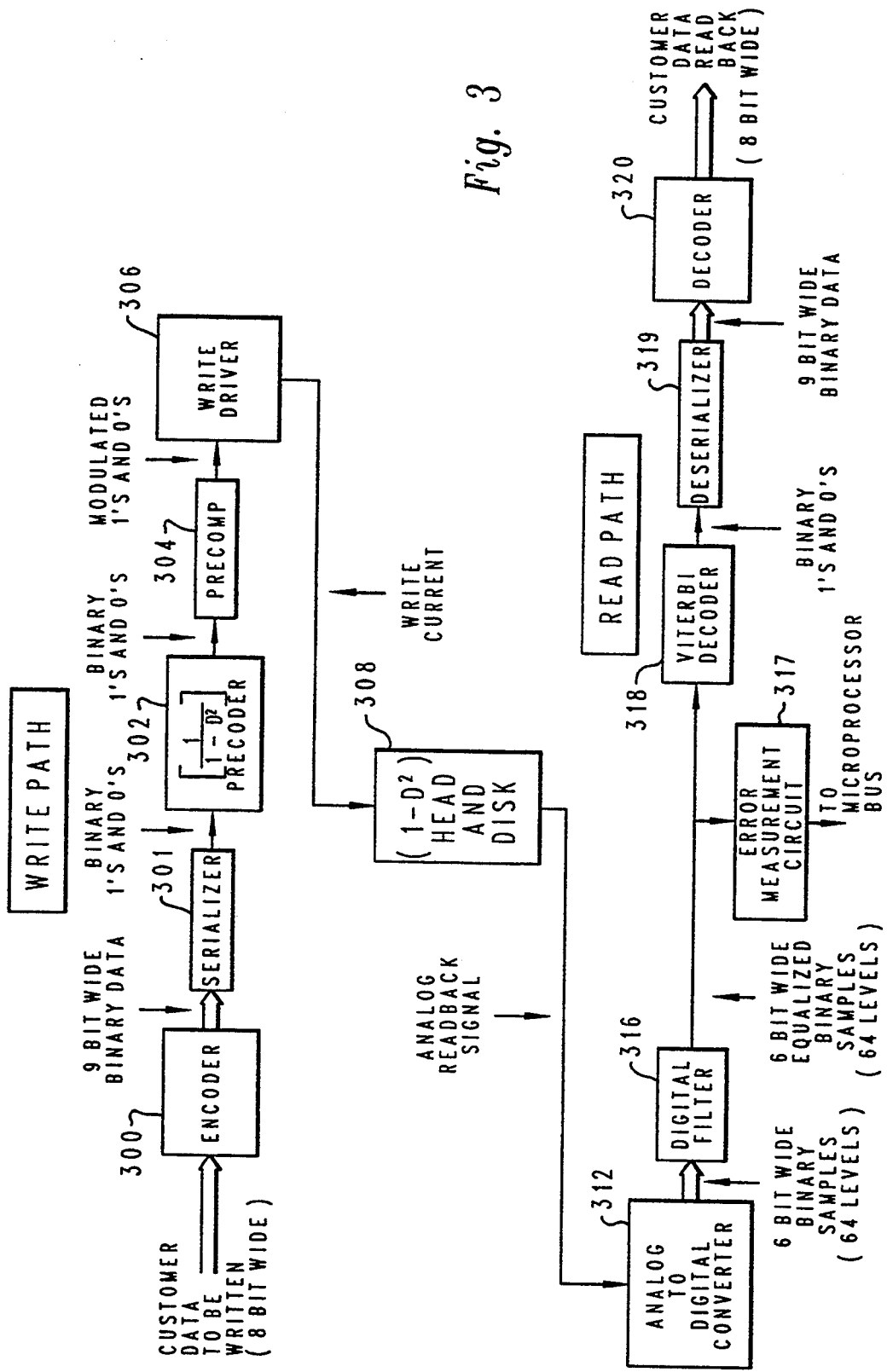
FIG. 3 is a block diagram illustrating the process of storing and retrieving data within the data storage and recovery system of FIG. 1.

Referring now to FIG. 3, there is shown a block diagram illustrating the process of storing and retrieving data within the data storage and recovery system of FIG. 1. Data to be written is applied to an encoder 300 for providing a modulation coded output having predefined run length constraints, such as for the minimum and maximum number of consecutive zeros and the maximum run length of zeros in the even and odd recorded sequences in the overall recorded sequence. The output of encoder 300 is applied to serializer 301 which takes the 9 bit parallel output of encoder 300 and translates it into a serial form. Precoder 302 follows the serializer 301 and is described by a $1/(1-D^2)$ operation where D is a unit delay operator. Precoder 302 cancels the effect of the $(1-D^2)$ equalized head and disk transfer function. This permits the customer data written to encoder 300 to be the same as the customer data output from the decoder 320. Precoder 302 is used to simplify the construction of encoder 300. Without precoder 302, it would be necessary to constrain the run length of ones, zeros, zero-one pairs and one-zero pairs. A precompensator 304 is coupled to the precoder 302 and provides a modulated binary pulse signal applied to a write driver 306. Precompensator 304 is used to compensate for nonlinear bit shift which occurs during the writing of the data to the disk surface by delaying in time the writing of selected bits representing the data. The compensated output from precompensator 304 is applied as a modulating function to write driver 306 which applies the write current to the write transducer.

An analog read signal is obtained at head and disk block 308 described by the $(1-D^2)$ operation. The read signal is converted to digital form by an analog to digital converter (ADC) 312 that provides 64 possible 6-bit sampled values. Digital filter 316 then takes the sampled values, filters them and outputs equalized data samples. The output of digital filter 316 is applied to a Viterbi decoder 318. The serial output of Viterbi decoder 318 is deserialized as depicted at block 319 which is coupled to a decoder 320 to complete the data recovery portion of the system.

The output of digital filter 316 is also applied to the general error measurement circuit illustrated in block 317. General error measurement circuit 317 takes as its input the equalized data samples and performs a test utilizing error value samples generated from the equalized data samples. Results of the test are then made available to a microprocessor bus of the data storage and recovery system.

Figure 4:
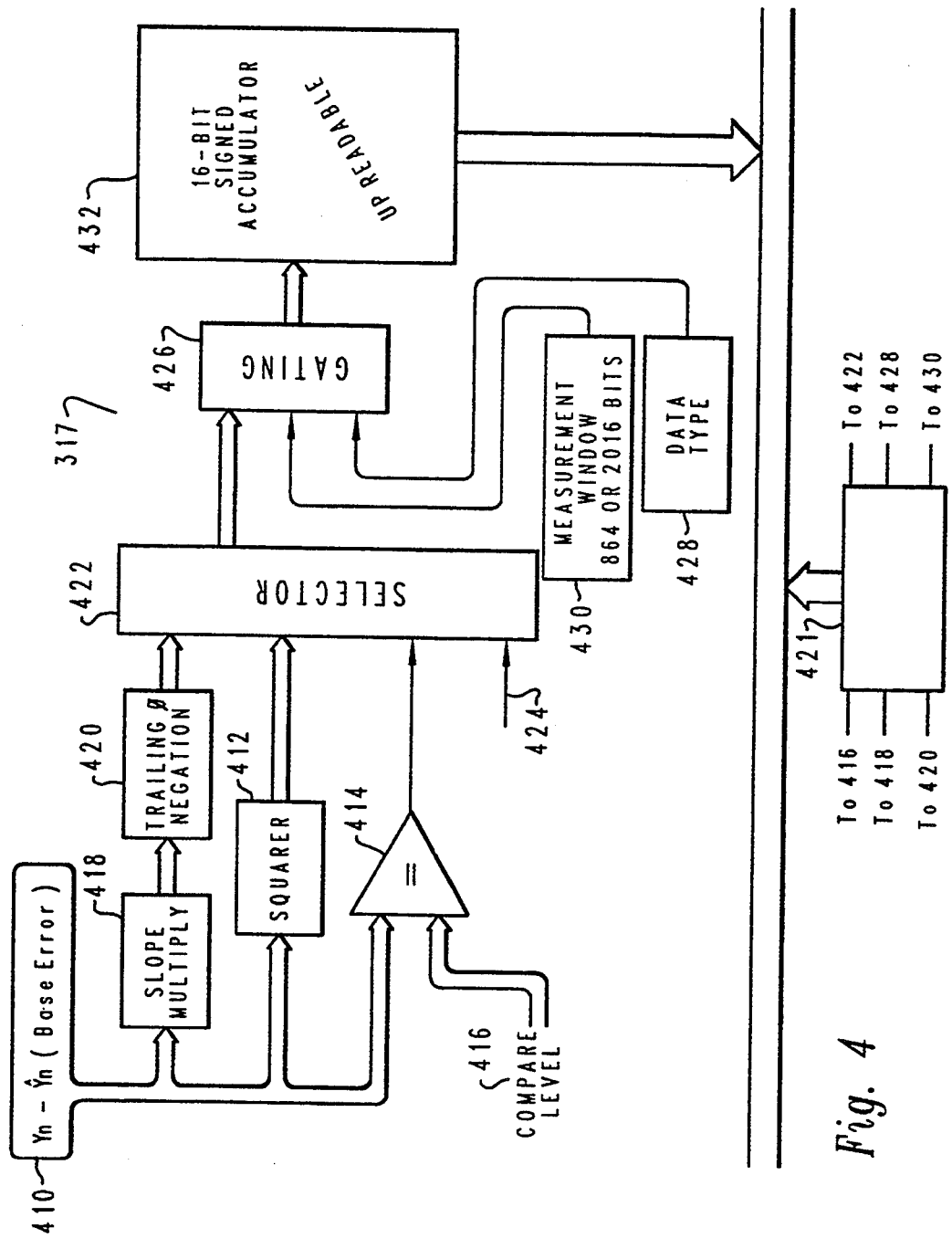
FIG. 4 is a block diagram illustrating a circuit for carrying out the error measurements within the data storage and recovery system in accordance with the present invention.

Referring now to FIG. 4, there is depicted a block diagram illustrating a circuit for carrying out the error measurements of error measurement circuit 317 according to the system and method of the present invention. Data samples output from block 316 (see FIG. 3) are received at block 410. Block 410 illustrates the generation of error value samples from the data samples. An error value sample is generated by calculating the difference between the expected value of the data sample and the value of the received data sample. The data samples have been obtained from a signal stored in the data storage and recovery system. A data type, such as a positive one, negative one, or zero is identified for each error value sample generated and associated with the received error value sample.

Error value samples are input to a first process path, a second process path and a third process path. Error value samples input to a first process path are squared by squarer 412. Squarer 412 generates a signal output comprising the square of each error value sample. Error value samples input to a second process path are compared to a compare level 416 by comparator 414. Comparator 414 generates an output comprising a logical one when the input error value sample is greater than or equal to compare level 416, and a logical zero when the input error value sample is less than compare level 416.

A third process path includes a multiplier 418 and an invertor 420. Error value samples input to the third process path may be processed by both multiplier 418 and invertor 420, or neither multiplier 418 nor invertor 420. In addition, error value samples input into the third process path may not be processed by either multiplier 418 or invertor 420. Selection is made by microprocessor 421 depending upon the test to be preformed.

Multiplier 418 multiplies each error value sample by a slope of the signal stored in the data storage and recovery system. Each instant along the stored signal has an associated slope. The slope of the stored signal associated with a data sample is multiplied by the error value sample generated from that data sample. The result of this multiplication is then input into invertor 420 if invertor 420 is to be a part of this process.

Invertor 420 receives as its input either multiplied error value samples if multiplier 418 was included in the process, or the error value samples if multiplier 418 was not included in the process. In response to an input of a consecutive number of error value samples or multiplied error value samples which are associated with a data type of zero, invertor 420 will invert the input by reversing the sign of the last error value sample or the last multiplied error value sample of the consecutive number.

Selector 422 receives a signal as an input from the first process path, the second process path, the third process path, or a source of level samples 424 of a logical data level. In a preferred embodiment, source of samples 424 provides a logical one as an input to selector 422. Microprocessor 421 uses Selector 422 to pass the output signal of one of the process paths, or the source of level samples 424 to Gate 426.

Once selector 422 has selected a signal generated by one of the process paths or sample source 424 as an input, selector 422 outputs the selected signal to gate 426. Gate 426 passes the selected signal in response to coincidence of the data type associated with a signal with a desired data type supplied by source 428. In a preferred embodiment, the length of time a signal is gated through gate 426 is a window of either 864 bits or 2016 bits as illustrated by source 430. The microprocessor 421 determines window length depending upon the number of samples required for a test.

The output of gate 426 is then accumulated in accumulator 432. The result now in accumulator 432 may be accessed by microprocessor 421 within the data storage and recovery system. The result may then be utilized to identify a problem within the data storage and recovery system.

The error measurement circuit may be utilized to perform many different tests which in the past have been performed by connecting the data storage and recovery system to test equipment such as digital oscilloscopes and logic analyzers. For example, nonlinear bit shift may be measured using the circuit. When a data pattern written on a disk has a value change after one bit, for example a write current data pattern of 111011 the magnetic field associated with the magnetic regions utilized to store these values begin to interact with adjacent regions magnetic boundaries resulting in the bits appearing shifted when the data pattern is read by the system. This may result in an incorrect data pattern being reproduced.

A precompensation value may be calculated by microprocessor 421 using information about the nonlinear bit shift obtained by the error measurement circuit. A recording of a signal is first made in the data storage and recovery system. The recording is then read and filtered as illustrated in FIG. 3, blocks 312 and 316. Samples obtained from the signal are then input into block 410 from which error value samples are generated.

Nonlinear bit shift is evaluated using the multiplier 418. The error value sample is then multiplied by the slope of the stored signal associated with the data sample from which the error value sample was generated. Selector 422 selects the third path and outputs the processed error value sample to gate 426. The data type to be utilized for gating the data samples for this test is zero data type only. Therefore, data type 428 is set to a zero data type. Only those processed error values associated with a data type of zero will be gated through and stored in the accumulator. Each processed error value sample is added to the value stored in accumulator 432. After the test is complete, the value stored in accumulator may be accessed by a microprocessor within data storage and recovery system to be input as a precompensation value into precompensation 304 as illustrated in FIG. 3.

Another test that may be performed is a delta fly height measurement. A predetermined encoded test pattern 11001100 is written to at least one predetermined region of the disk surface 20. Analysis of data samples read back from the predetermined encoded pattern 11001100 is used to identify an average deviation value corresponding to flying height changes. When the delta fly height is low, the resulting value in means for accumulating 432 will be low. When the delta fly height is high, the resulting value in means for accumulating 432 will be high.

Data samples of the recorded signal are input into block 410 and error value samples are generated. The third process path is selected and both multiplier 418 and invertor 420 are utilized. Each error value sample is multiplied in multiplier 418 by the slope of the stored signal associated with the data sample from which the error value sample was generated. If the error value sample was generated from a data sample associated with the last zero of a consecutive number zeros, the sign of the error value sample will be inverted. Selector 422 outputs the processed error value sample to gate 426. The data type to be utilized for gating the data samples for this test is zero data type only. Therefore, data type 428 is set to a zero data type. The length of the test may be either 864 or 2016 bits as selected by block 430. Each processed error value sample is added to the value stored in accumulator 432. After the test is complete, the value stored in accumulator may be accessed by a microprocessor within data storage and recovery system to evaluate and correct fly height.

On occasion the average value of all error value samples may need to be determined. In this case, the third process path is used and neither multiplier 418 nor invertor 420 is utilized. Selector 422 selects the third process path and outputs each error value sample to gate 426. The data types to be utilized for gating the data samples for this test are all types, including zeros, ones, and negative ones. The length of the test may be either 864 or 2016 bits as selected by block 430. The result stored at the end of the test in accumulator 432 will be the total of all error value samples.

In order to count the number of error value samples received, another read is performed with selector 422 selecting source 424. The data level for source 424 in a preferred embodiment is a logical one. The data type for this test is set for all types as depicted by block 428 and the duration may be set to either 864 or 2016 as depicted by block 430. Gating 426 will therefore output a logical one to accumulator 432 for each error value sample. The result in accumulator 432 will be the total number of error value samples read. The average may then be calculated using the total number of error value samples read and the sum of all error value samples.

The first path is utilized for an evaluation the accuracy of the overall data storage and recovery system. Squarer 412 squares each error value sample received. Selector 422 selects the first path and output the squared error value sample to gate 426. All data types are to be gated. The duration of the test may vary. Gate 426 outputs the squared error value sample to accumulator 432 which then adds the squares of each error value sample. More accurate systems have a low sum of the squares of the error value samples.

Another test may be performed to determine the level of noise in the data storage and recovery system, the second process path is used. Error value samples are compared utilizing comparator 414 to a predetermined compare level 416. If the error value sample is greater than or equal to compare level 416, comparator 414 outputs a logical one. If the error value sample is less than compare level 416, comparator 414 outputs a logical zero. Selector 422 selects the second process path and outputs the result of comparator 414 to gate 426. The data type will vary depending on which analog to digital converter 312 level the error measurement circuit is reading. Accumulator 432 will then represent the output of comparator 414 for each level. A microprocessor within data storage and recovery system may obtain each output and create a plot which will illustrate a distribution of all data sample values. This distribution may be used to determine the amount of noise in the system.

While the invention has been particularly shown and described with reference to a preferred embodiment, it will be understood by those skilled in the art that various changes in form and detail may be made therein without departing from the spirit and scope of the invention.

What is claimed is:

1. A circuit for performing test procedures on a data storage and recovery system from data samples obtained from a recovered signal, wherein the data samples are associated with a particular data type, the circuit comprising:

means for generating error value samples from the data samples;

a first process path taking the error value samples as inputs of the first process path and including means for generating an output signal comprising a square of each error value sample;

a second process path taking the error value samples and a compare level as inputs of the second process path and including means for comparing the inputs and generating an output signal comprising results of each comparison;

a source of a sample signal at a logical data level;

means for selecting an evaluation signal from the output signals or the sample signal;

means for identifying a particular data type to each error value sample;

means responsive to coincidence of a data type of the evaluation signals with a desired data type for gating the evaluation signal; and means for accumulating the evaluation signal for a predetermined period.

2. The circuit according to claim 1, further comprising a third process path taking error value samples as its input and passing a signal comprising the error value samples as an output signal to the means for selecting.

3. The circuit according to claim 2, wherein the third process path further comprises means for multiplying each error value sample by a slope of the recovered signal, wherein each error value sample includes an associated slope.

4. The circuit according to claim 3, wherein the third process path further comprises means responsive to an input of a consecutive number of error value samples generated by data samples associated with data types of zero for inverting a sign of a last error value sample generated by a data sample which is associated with a data type of zero.

5. The circuit according to claim 2, wherein the third process path further comprises means responsive to an input of a consecutive number of error value samples generated by data samples associated with data types of zero for inverting the sign of a last error value sample generated by a data sample which is associated with a data type of zero.

6. The circuit according to claim 1, wherein the result of the second process path is a logical data level "one" if the error value sample is greater than the compare level.

7. The circuit according to claim 1, wherein the result of the second process path is a logical data level "zero" if the error value sample is less than the compare value.

8. The circuit according to claim 1, wherein the predetermined period is 864 bits.

9. The circuit according to claim 1, wherein the predetermined period is 2016 bits.

10. The circuit according to claim 1, wherein the accumulated evaluation signal may be accessed by a data processing system for calculation of correction values utilized in a data storage system.

11. A circuit for performing test procedures on a data storage and recovery system from data samples obtained from a recovered signal, wherein the data samples are associated with a particular data type, the circuit comprising:

means for generating error value samples from data samples obtained from a stored signal;

a first process path taking the error value samples as its input and including means for generating an output signal comprising the square of each error value sample;

a second process path taking the error value samples and a compare level as its inputs and including means for comparing the inputs and generating an output signal comprising results of each comparison;

a third process path taking the error value samples as its input and passing a signal comprising the error value samples as an output signal;

means for selecting an evaluation signal from the output signals or the sample signal;

means for identifying a particular data type to each error value sample;

means responsive to coincidence of a data type of the evaluation signal with a desired data type for gating the evaluation signal; and means for accumulating the evaluation signal for a predetermined period.

12. The circuit according to claim 11, wherein the third process path further comprises means for multiplying each error value sample by a slope of the recovered signal, wherein each error value sample includes an associated slope.

13. The circuit according to claim 12, wherein the third process path further comprises means responsive to an input of a consecutive number of error value samples generated by data samples associated with data types of zero for inverting a sign of a last error value sample generated by a data sample which is associated with a data type of zero.

14. The circuit according to claim 11, wherein third process path further comprises means responsive to an input of a consecutive number of error value samples generated by data samples associated with data types of zero for inverting the sign of a last error value sample generated by a data sample which is associated with a data type of zero.

15. The circuit according to claim 11, wherein the result of the second process path is a logical data level "one" if the error value sample is greater than the compare level.

16. The circuit according to claim 11, wherein the result of the second process path is a logical data level "zero" if the error value sample is less than the compare value.

17. The circuit according to claim 11, wherein the predetermined period is 864 bits.

18. The circuit according to claim 11, wherein the predetermined period is 2016 bits.

19. The circuit according to claim 11, wherein the accumulated evaluation signal may be accessed by a data processing system for calculation of correction values utilized in performing test procedures on the data storage and recovery system.

20. A method in a data storage and recovery system for performing tests on the data storage and recovery system from data samples obtained from a recovered signal, the data samples being associated with a particular data type, the method comprising the steps of:
generating error value samples from data types obtained from a stored signal;
providing samples at a logical data level;
generating an output signal comprising a square of each error value samples from error value samples input into a first process path;
comparing error value samples and a compare level input into a second process path and generating an output signal comprising a result of each comparison;
selecting an output signal or the samples at the logical data level;
identifying a particular data type at each error value sample;
gating the output signal from the step of selecting in response to a coincidence of a data type associated with a signal with a desired data type; and
accumulating the output signal gated in response to a coincidence for a predetermined period, wherein the accumulated, gated sample may be accessed by a data processing system for calculation of correction values utilized in performing tests on the data storage and recovery system.

21. The method according to claim 20, further comprising the step of generating an output signal comprising the error value samples as the output signal.

22. The method according to claim 21, and further comprising the step of multiplying each error value sample by a slope of the recovered signal, wherein each error value sample includes an associated slope.

23. The method according to claim 22, and further comprising a step responsive to an input of a consecutive number of error value samples generated by data samples associated with data types of zero, inverting a sign of a last error value sample generated by a data sample which is associated with a data type of zero to provide an output signal.

24. The method according to claim 21, further comprising the step of in response to an input of a consecutive number of error value samples generated by data samples associated with data types of zero, inverting the sign of a last error value sample generated by a data sample which is associated with a data type of zero to provide an output signal.

25. The method according to claim 20, wherein the result of the comparing step is a logical data level "one" if the error value sample is greater than the compare level.

26. The method according to claim 20, wherein the result of the comparing step is a logical data level "zero" if the error value sample is less than the compare value.

27. The method according to claim 20, wherein the predetermined period is 864 bits.

28. The method according to claim 20, wherein the predetermined period is 2016 bits.

29. An apparatus for storing and recovering information, comprising:
a housing;
a spindle rotatably attached to said housing;
a disk having a surface mounted to said spindle;
a transducer movable across the surface of said disk, said transducer reading or writing information to or from said disk;
a data channel for encoding data to be written to said disk and for decoding data after information is read from said disk; and
a circuit having as an input, a signal from said data channel, said circuit comprising:
means for generating error value samples from the data samples;
a first process path taking the error value samples as inputs of the first process path and including means for generating an output signal comprising a square of each error value sample;
a second process path taking the error value samples and a compare level as inputs of the second process path and including means for comparing the inputs and generating an output signal comprising results of each comparison;
a source of a sample signal at a logical data level;
means for selecting an evaluation signal from the output signals or the sample signal;
means for identifying a particular data type to each error value sample;
means responsive to coincidence of a data type of the evaluation signals with a desired data type for gating the evaluation signal; and
means for accumulating the evaluation signal for a predetermined period.

* * * * *